(12) United States Patent
Finley

(10) Patent No.: US 10,124,830 B1
(45) Date of Patent: *Nov. 13, 2018

(54) COMPOSITE UNDER BODY STRUCTURE

(71) Applicant: BrandFX LLC, Fort Worth, TX (US)

(72) Inventor: Alfred L. Finley, Fort Worth, TX (US)

(73) Assignee: BrandFX LLC, Fort Worth, TX (US)

( * ) Notice: Subject to any disclaimer, the term of this patent is extended or adjusted under 35 U.S.C. 154(b) by 142 days.

This patent is subject to a terminal disclaimer.

(21) Appl. No.: 15/341,359

(22) Filed: Nov. 2, 2016

Related U.S. Application Data

(63) Continuation of application No. 14/627,911, filed on Feb. 20, 2015, now Pat. No. 9,499,203.

(60) Provisional application No. 61/942,726, filed on Feb. 21, 2014.

(51) Int. Cl.
| | | |
|---|---|---|
| *B62D 21/10* | (2006.01) | |
| *B62D 21/09* | (2006.01) | |
| *B62D 21/18* | (2006.01) | |
| *B62D 29/04* | (2006.01) | |

(52) U.S. Cl.
CPC ............. *B62D 21/10* (2013.01); *B62D 21/09* (2013.01); *B62D 21/18* (2013.01); *B62D 29/041* (2013.01)

(58) Field of Classification Search
CPC ........ B62D 21/10; B62D 21/09; B62D 21/18; B62D 29/041
USPC .. 296/193.07, 184.1, 18.3, 183.1, 35.1, 35.3
See application file for complete search history.

(56) References Cited

U.S. PATENT DOCUMENTS

| | | |
|---|---|---|
| 2,230,448 A | 2/1941 | Best |
| 3,481,643 A | 12/1969 | Campbell |
| 4,333,678 A | 6/1982 | Munoz et al. |
| D424,509 S | 5/2000 | Meyers |
| 6,547,310 B2 | 4/2003 | Myers |
| 6,604,778 B2 | 8/2003 | Doshi |
| 6,857,683 B2 | 2/2005 | Myers |
| 6,986,540 B2 * | 1/2006 | Augustine .......... B62D 25/2054 296/181.3 |
| 7,784,856 B2 | 8/2010 | Fuchs et al. |
| RE41,724 E | 9/2010 | Myers |
| 2009/0200350 A1 | 8/2009 | Brallier et al. |
| 2009/0200351 A1 | 8/2009 | Brallier et al. |

* cited by examiner

*Primary Examiner* — Joseph D. Pape
(74) *Attorney, Agent, or Firm* — ERICKSON KERNELL IP, LLC; Kent R. Erickson

(57) ABSTRACT

A system for supporting the bed of a utility vehicle, the system adapted to be mounted on the underbody frame of the utility vehicle, the system comprising: a generally planar unitary support formed from a composite material, the support having a first surface and a second vertically offset surface; a plurality of connecting members extending from the first surface to the offset surface, the members providing strength to said support; a generally rectangular panel fabricated from a composite material, the panel adhesively attached to said offset surface, the panel adapted to serve as a loading surface for the bed of the utility vehicle; a bracket secured to the support for mounting the support to the frame of the utility vehicle; and a backing plate secured to the support, wherein the plate and the bracket sandwich the support to secure it to the frame of the vehicle.

16 Claims, 8 Drawing Sheets

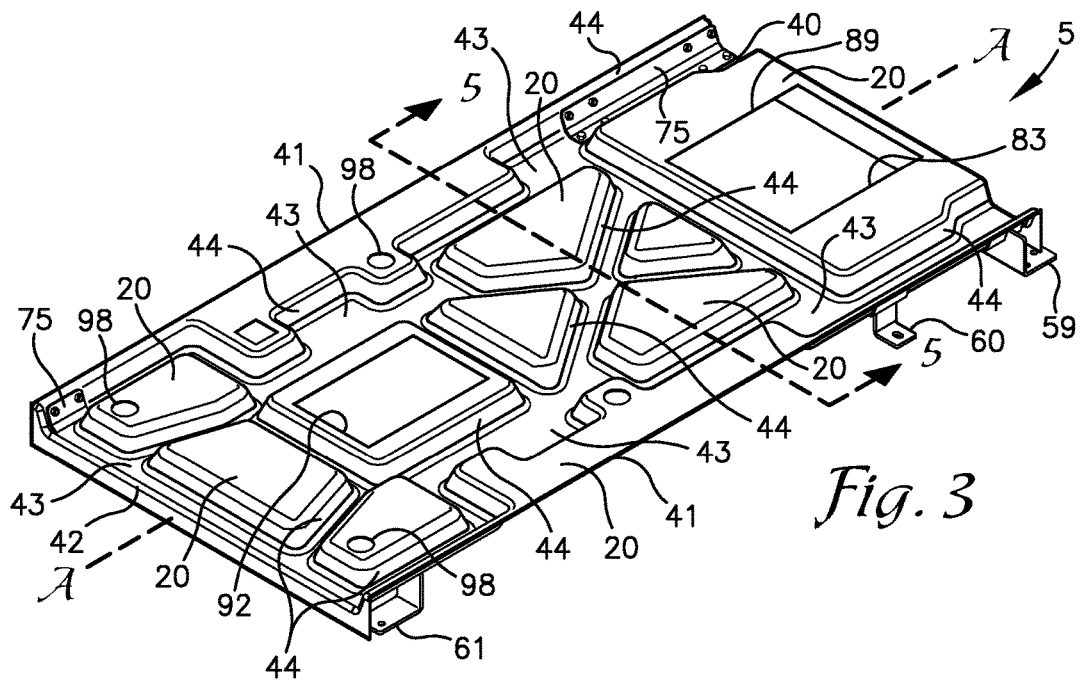
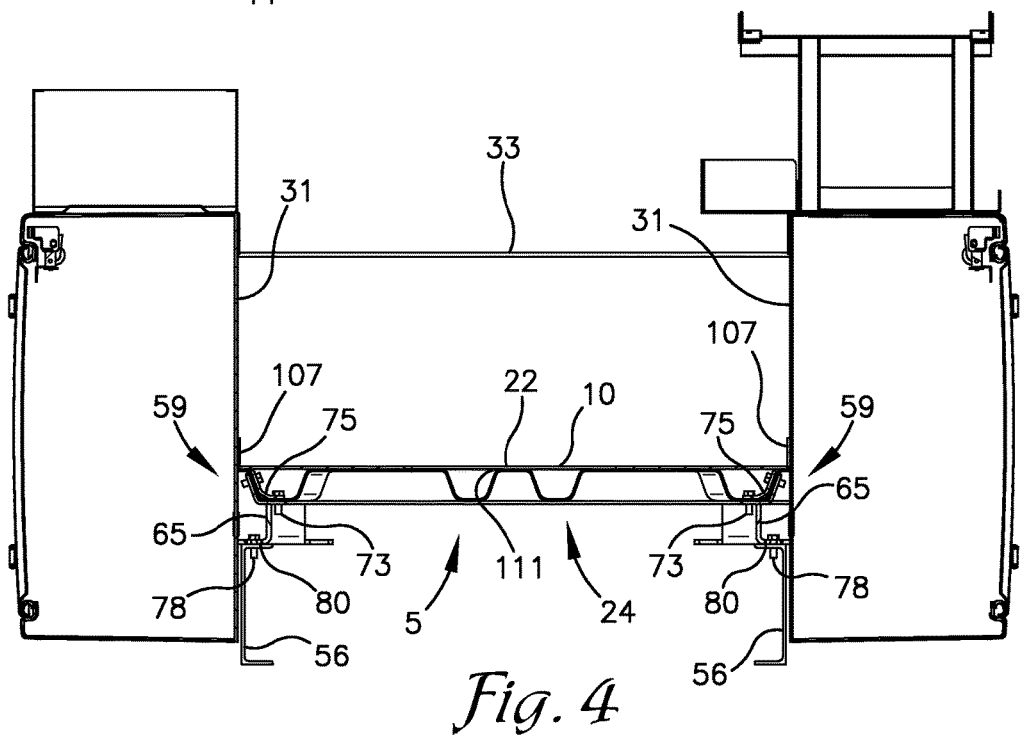

COMPOSITE UNDER BODY STRUCTURE

CROSS-REFERENCE TO RELATED APPLICATIONS

This application is a continuation of U.S. patent application Ser. No. 14/627,911 filed Feb. 20, 2015, which claims the benefit of U.S. provisional patent application Ser. No. 61/942,726, filed Feb. 21, 2014, under 35 U.S.C. § 119(e).

BACKGROUND OF THE INVENTION

Field of the Invention

This invention relates to support structures located underneath the shell or body of a vehicle. More specifically, it relates to corrugated support structures formed of composite material located below the bed of a utility vehicle.

Background & Description of the Related Art

It is common for public works departments, contractors and service companies to send workers into the field to provide on-site services at remote locations. To perform these services, technicians must usually take tools or materials with them to the job site. One way to transport such items is to load them on a utility vehicle and drive the vehicle to the job site. Typically, these utility vehicles are truck type motor vehicles comprising multiple storage compartments and a bed area for receiving cargo. The vehicles may include an aerial lift or equipment tower to reach elevated locations. The vehicles are designed to maximize storage space on the vehicle while allowing transportation of large, heavy tools that may not be suitably transported by other vehicles.

Furthermore, these utility vehicles are often operated in a harsh and demanding manner. It is not uncommon for heavy tools to be tossed or dropped into the bed of the vehicle. Repeated impact from heavy tools or cargo can damage a bed that is not properly supported. The terrain on which the utility vehicles are driven can be rugged which causes bouncing and shifting of heavy cargo in the bed. These utility vehicles may be used in severe weather such as extreme temperatures, precipitation and high winds. For these reasons, these utility vehicles must be structurally robust and durable.

To help improve durability and strength, many utility vehicles incorporate a support structure located beneath the bed of the vehicle. This support structure is commonly referred to as an understructure. The understructure helps to support and reinforce the bed as it encounters heavy loads and repeated impact from cargo. The understructure also helps support the vehicle's body which usually includes numerous racks and utility compartments.

Traditional understructures comprise steel or aluminum tube members welded together in a rectangular configuration. The understructure typically has mounting brackets along its perimeter which are used to bolt the understructure to a vehicle frame. Although a traditional metal understructure provides a sturdy support system, it has certain drawbacks. First, the understructure adds significant weight to the vehicle due to its heavy metal construction. The added weight can impact gas mileage and longevity of the vehicle's suspension system. Second, a traditional metal understructure is highly susceptible to corrosion due to environmental conditions. Water, salt, and other chemicals found on roadways tend to splash onto metal understructures and lead to rust or other corrosion.

What is needed in the industry is an understructure that provides the strength and durability of a traditional metal understructure without the weight and corrosion issues mentioned above. As is discussed below, the present invention addresses this need.

SUMMARY OF THE INVENTION

The present invention is directed to a composite understructure and bed for a utility vehicle which may be used on all types of utility vehicles including those having an aerial tower. The understructure is generally planar with a unique arrangement of corrugations and elevated surfaces that help to strengthen and stiffen the understructure. The corrugations create vertical segments, or walls, that act as strengtheners for the understructure. A floor plate, which forms the loading surface of the bed of the vehicle, can be attached over the top of the understructure. The floor plate and understructure together form a bed support assembly. The understructure may have cut-outs to accommodate an aerial tower or access a fuel tank. The understructure may also have cut-outs between its stiffening walls to reduce its weight. The understructure and floor plate are preferably formed from a fiber reinforced composite material such as fiberglass formed from glass fibers and a thermoset resin.

BRIEF DESCRIPTION OF THE DRAWINGS

FIG. 3 is a perspective view of the composite understructure of FIG. 2.

FIG. 4 is a cross-sectional view of the bed of the utility vehicle taken along line 4-4 of FIG. 1.

DETAILED DESCRIPTION OF THE PREFERRED EMBODIMENTS

Figure 1:
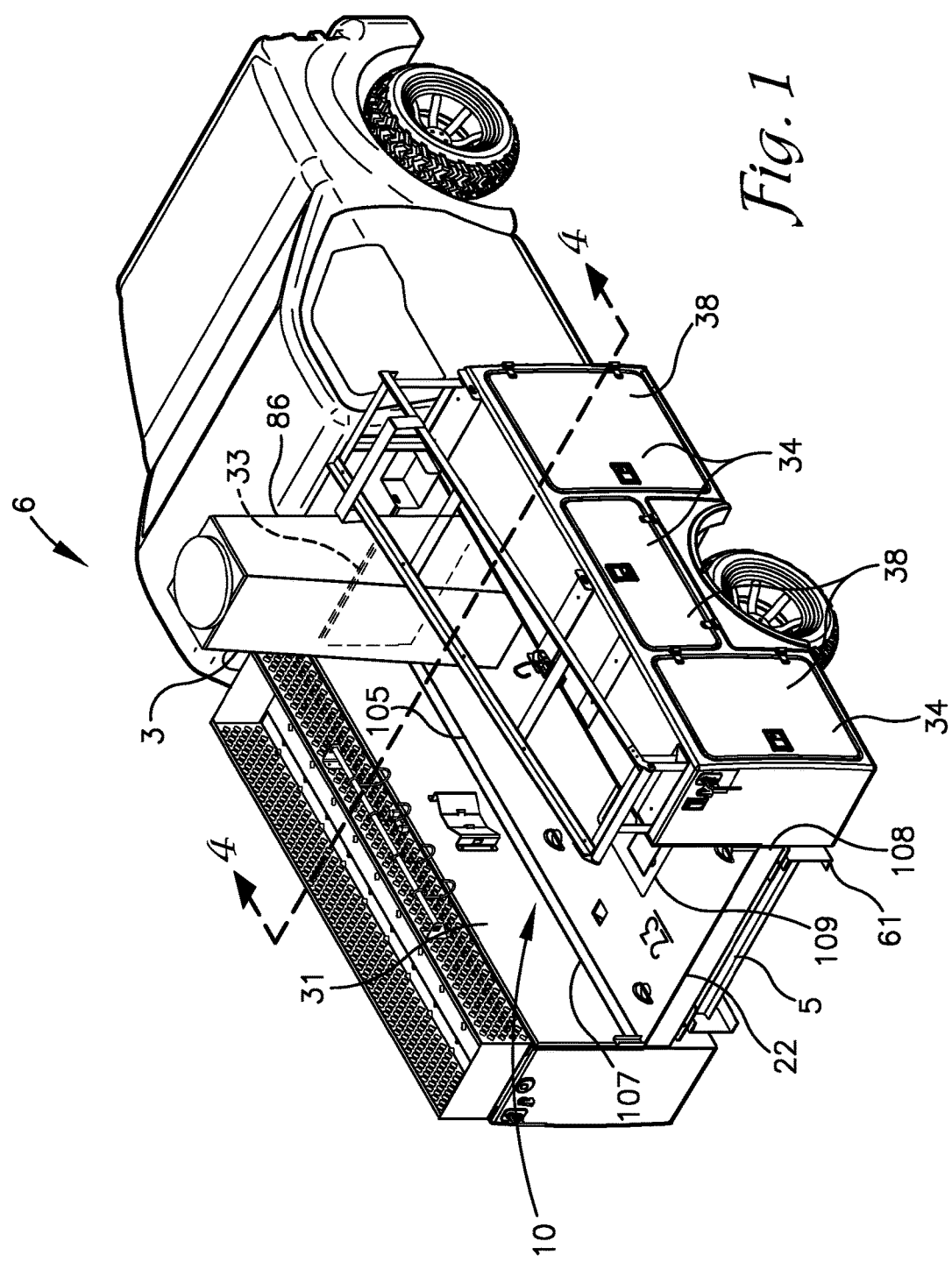
FIG. 1 is a perspective view of a utility vehicle having an aerial tower.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," "leftwardly," "upper," and "lower" will refer to the installed position (as shown in the drawings) of the item to which the reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

The invention comprises a bed support assembly. The assembly includes a vehicle bed plate which presents a loading surface secured over the top of a corrugated understructure formed of composite material such as fiber reinforced polymer or fiberglass, mounted by a series of brackets to the vehicle's frame. FIGS. 1-5 and 11 show a first embodiment of the invention employed with a utility truck 6 having an aerial tower 3, and FIGS. 6-10 show a second embodiment of the invention as used with a flatbed utility vehicle 206. The first embodiment of the bed support assembly 24 accommodates the truck's aerial tower 3 and the fuel tank 4 while the second embodiment of the bed support assembly 224, used with the flatbed truck 206, does not. The bed support assemblies 24 and 224 each include a bed or floor plate 22 or 222 which forms a loading surface, secured over a corrugated, generally planar understructure 5 or 205 which is secured to a vehicle's frame by a series of brackets 59, 60, 61.

Figure 2:
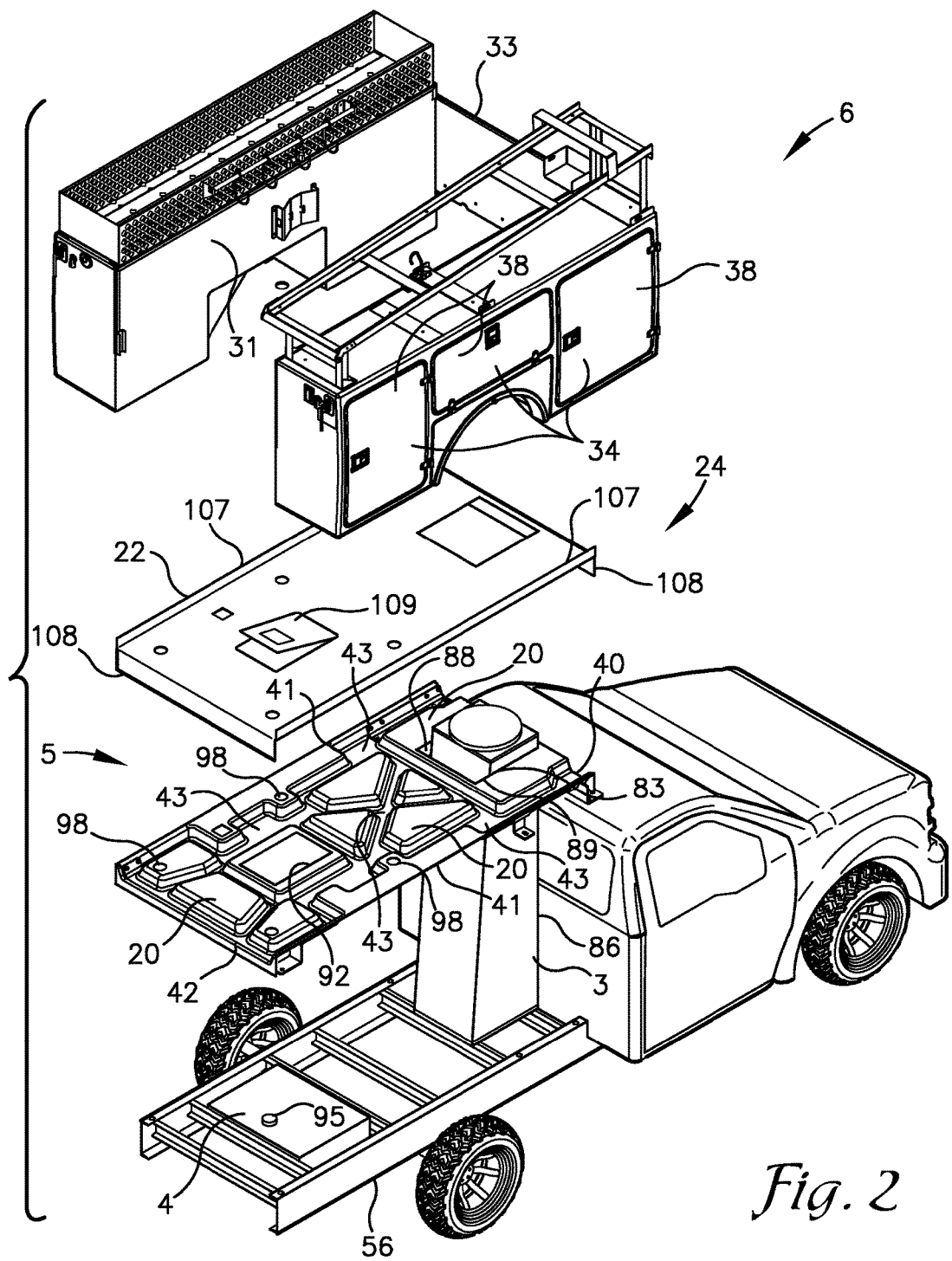
FIG. 2 is an exploded perspective view of the rear cargo area of the utility vehicle of FIG. 1, showing a first embodiment of the understructure in accordance with the present invention.
Figure 5:
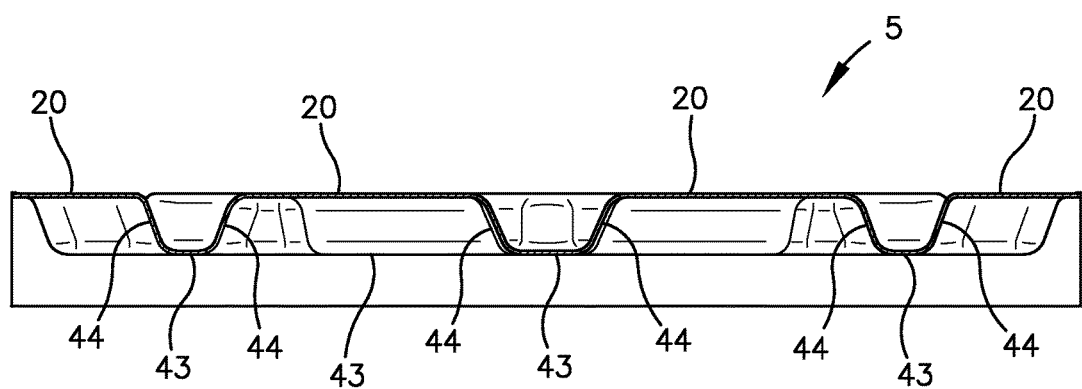
FIG. 5 is a cross-sectional view of the composite understructure taken along line 5-5 of FIG. 3.
Figure 6:
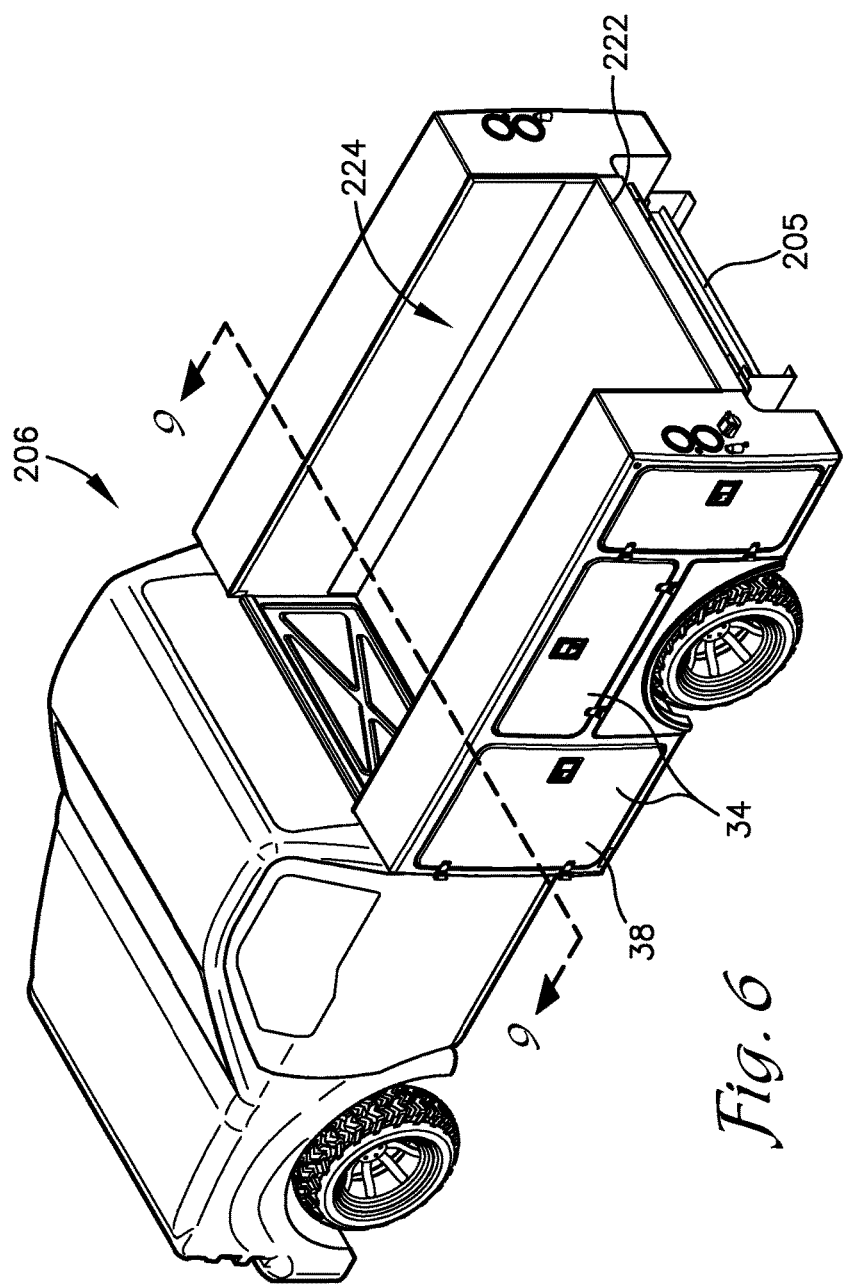
FIG. 6 is a perspective view of a second embodiment of a utility vehicle which does not include an aerial tower.

Now, the first embodiment, bed support assembly 24, will be discussed in detail. As best seen in FIGS. 2 and 4, the understructure 5 is installed beneath the rear cargo area or bed 10 of utility vehicle 6. The bed 10 is defined by the floor plate 22, side walls 31, and a front wall 33. In some situations, bed 10 may also comprise a rear gate but the gate is not required or shown. Side walls 31 are often formed from the back walls of utility compartments 34 which are installed along the sides of the bed 10. Utility compartments 34 are used for storage of the smaller tools and materials transported on the utility vehicle 6. The utility compartments 34 are generally configured such that their doors 38 open away from the bed 10. It is foreseen that certain utility vehicles 6 may not include utility compartments 34 or the compartments may not be along the sides of bed 10 in which case side walls 31 will not be formed from the back walls of the compartments. It is also foreseen that on certain vehicles, bed 10 may not include any side walls 31 or a front wall 33. A bed 10 without any walls would be defined only by the periphery of floor plate 22.

The understructure 5, as seen in FIG. 3, is a generally rectangular platform having a front edge 40, side edges 41, and back edge 42. Because the understructure 5 is fabricated from composite material, it is lighter and more resistant to corrosion than conventional metal understructures.

The understructure 5 is corrugated to include a unique arrangement of raised areas or ridges 20. Each ridge 20 extends upwardly from the surface 43 of the understructure 5 and is formed by a generally vertically extending projection, connecting member or wall 44 that extends transverse to the plane of the surface 43 of the understructure 5. Each wall 44 adds strength and stiffness to the understructure 5 to help minimize flexing and increase strength when the understructure 5 is exposed to transverse or bending forces acting perpendicular to the plane of the understructure 5 (e.g., when cargo is placed in bed 10). The ridges 20 each extend the same distance from the surface 43 with a plateaued configuration, or a flat top, to form to top surface of the understructure 5. Alternatively, the ridges 20 could extend downwardly from the surface 43 to present grooves. Still yet, the understructure 5 could be formed with a combination of ridges and grooves.

Each wall 44 is more resistant to flexing than the planar surface 43 of the understructure 5 when a force acts perpendicular to the plane of the understructure 5. This is due in part to the differences between the area moments of inertia of the cross-sections of the planar surface 43 and the walls 44. The cross-sections of the walls 44 have a larger area moment of inertia than the cross-sections of the planar surface 43 with respect to a perpendicular or transverse force. The difference in area moments of inertia is primarily due to the vertical orientation of the walls 44 compared to the horizontal orientation of the planar surface 43.

The shape and layout of the raised areas 20 may vary based on the physical characteristics of understructure 5 and its anticipated use. For example, certain layouts may perform better than others for different types of composite materials. Layouts may also vary depending on the desired size, weight or use of the truck 6. As shown in FIGS. 2 and 3, a preferred layout for raised areas 20 includes walls 44 which run diagonally or crosswise with respect to the rectangular shape of understructure 5. In other words, at least one of the walls 44 is oriented at an angle across the understructure 5 so the wall is neither parallel nor perpendicular to any of the edges of understructure 5. The "X" shaped wall pattern perform particularly well because such pattern adds strength and stiffness to the understructure 5 while still permitting some flexing to prevent cracking.

The raised areas 20 on the understructure 5 are typically mirrored about a longitudinal axis, axis A-A as shown in FIG. 3, running from the midpoint of front edge 40 to the midpoint of back edge 42. That is, for each area that is raised on one side of the longitudinal axis, there is a corresponding area mirrored on the opposite side of the axis that is similarly raised. Accordingly, the walls 44 are also mirrored about the longitudinal axis. While a mirrored configuration appears to be most effective for improving strength and stiffness of understructure 5, it is foreseen that certain non-mirrored arrangements could also be effective.

Figure 11:
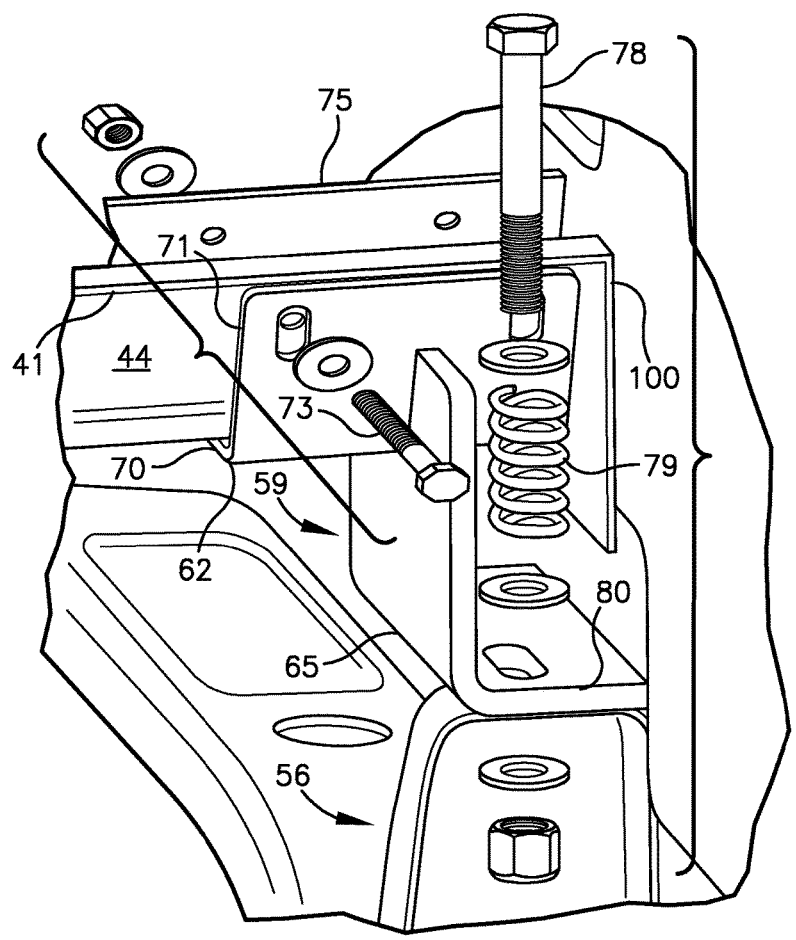
FIG. 11 is an enlarged fragmentary, exploded view of a mounting bracket for either the first or second embodiments of the understructure.

The understructure 5 is attached to utility vehicle 6 using brackets 59, 60, 61 which are shown in FIGS. 3, 4 and 11. The brackets 59, 60, 61 are secured to the understructure 5 prior to the understructure 5 being secured to floor plate 22. As seen in FIGS. 3 and 4, the front brackets 59 are located at the front corners of the understructure 5 and the rear brackets 61 are at the rear corners. The middle brackets 60 are located along the sides of the understructure 5 between the front brackets 59 and rear brackets 61. As best shown in FIG. 11, each front bracket 59 comprises an L-shaped upper support 62 attached to an L-shaped base 65. The upper support 62 forms a slightly obtuse angle but alternatively it could form a right angle. The upper support 62 receives a front portion of the side wall 44 that is proximate a side edge 41 of the understructure. The side wall 44 engages the inner surface of the vertically extending flange 71 of the upper support 62 such that the understructure's surface 43 rests on the horizontal flange or leg 70 of the support 62 and an outer surface of the side wall 44 contacts an angled vertical flange or leg 71 of the support 62.

The horizontal leg 70 and vertical leg 71 each have holes for receiving a threaded fastener 73 such as a bolt therethrough. Corresponding holes are drilled through the side wall 44 and the surface 43 to align with the holes in the horizontal leg 70 and vertical leg 71. Threaded fasteners 73 are inserted through the holes and secured against a back plate 75 using threaded nuts or the like. The back plate 75 has an angled configuration similar to upper support 62 and the plate is positioned on the inner surface of side wall 44 and the surface 43. When the threaded fasteners 73 are tightened, the bracket 59 is securely attached to the understructure 5 by sandwiching it between the back plate 75 and the upper support 62. It is foreseen that a middle bracket 60 could share a back plate with either a front bracket 59 or back bracket 61 if the middle bracket is proximate either of those brackets.

The understructure 5 is attached to the vehicle frame 56 by securing the front, middle and back brackets 59, 60, 61 to the frame 56. As best seen in FIGS. 4 and 11, threaded fasteners 78 such as bolts are used to secure the brackets 59, 60, 61 to the vehicle frame 56. The base 65 of the bracket 59 generally forms a right angle to include a horizontal mounting plate 80 that contacts the frame 56. There is at least one hole in each mounting plate 80 for receiving a threaded fastener 78. Depending on the size of the understructure 5, the mounting plates 80 for the bracket 59 could have multiple holes and utilize multiple threaded fasteners to hold the understructure to the frame 56. To secure the understructure 5 to frame 56, the holes in the mounting plates 80 are aligned with corresponding holes in the frame 56 and threaded fasteners 78 are inserted therethrough. Threaded fasteners 78 are tightened using threaded nuts or the like, thus securing the understructure 5 to the vehicle frame 56. It should be understood that although bracket 59 is discussed in detail, brackets 60 and 61 secure the understructure 5 to the frame 56 in a similar fashion.

It is foreseen that various hardware could be used with the threaded fasteners 78 such as washers and lock washers when connecting the understructure 5 to the frame 56. In some installations it may be beneficial to use a spring bolt connection as shown in FIG. 11. With such a connection, the bolt 78 is inserted through a spring 79 before the bolt 78 is inserted through the holes in the mounting plate 80 and frame 56. The spring is sandwiched between two washers and located on top of the mounting plate 80 which is on top of frame 56. For a spring bolt connection, the bolt 78 is partially tightened to secure the mounting plate 80 to frame 56, but not tightened to the point of fully compressing the spring. A spring bolt connection allows the frame 56 to temporarily separate from mounting plate 80 by compressing the spring for shock absorption purposes.

Preferably, six brackets 59, 60, 61 secure the understructure 5 to the vehicle frame 56 (a front 59, middle 60 and back 61 bracket on each side of the understructure 5 with each pair being aligned). However, it is foreseen that the number and type of brackets could vary. For example, a large understructure might require more middle brackets or a small understructure may not require any middle brackets. Also, there could be brackets located away from the edges of the understructure such as toward the center of the understructure. It is also foreseeable that brackets could be located along the front and back edges of the understructure depending on the configuration of the vehicle frame.

Understructure 5 has openings 83 and 92 formed therein to allow installation of an aerial lift or tower 3 and access to the fuel tank 4, as seen in FIGS. 2 and 3. The aerial tower opening 83 is square shaped and sized to allow the base 86 of the aerial tower 3 to extend through the opening 83. The aerial tower 3 typically attaches directly to the frame 56 of the utility vehicle 6 and projects above the understructure 5 and is stored in or above the bed 10 of the vehicle. The aerial tower or lift 3 may have a basket for holding a worker or some other device attached to the distal end of the tower. When the tower 3 and the understructure 5 are installed, the understructure 5 is configured such that the base 86 extends up through opening 83 with only a small gap 88 between the perimeter 89 of opening 83 and base 86. The gap 88 is large enough to allow vibrations and some movement by base 86 (for example when tower 3 is supporting a load or when the vehicle is in motion) without the base contacting the understructure 5. The gap 88 is small enough to prevent tools and other items from falling into the gap and potentially onto the ground under vehicle 6. In this embodiment, the aerial tower opening 83 is generally located toward the front of the understructure 5 and centered along longitudinal axis A-A. It is foreseen that other shapes, sizes and locations can be used for the aerial tower opening 83.

The understructure 5 also has an opening 92 to allow access to fuel tank 4. Fuel tank access opening 92 is square shaped and positioned above the primary inlet 95 to the fuel tank 4. Generally, fuel tank 4 has a fuel pump assembly and sensors located within the tank and those components are usually installed through the fuel tank inlet 95. Fuel tank access opening 92 allows convenient access to these components. The fuel tank access opening 92 is large enough to allow access to the components for maintenance or repair so that the bed support assembly 24 and tank 4 need not be removed from vehicle 6 during maintenance. The size and location of fuel tank access opening 92 will depend on the size and configuration of fuel tank 4 and inlet 95. In this embodiment, the opening 92 is generally located on the back half of the understructure 5 and centered along longitudinal axis A-A. Fuel tank 4 is typically not filled with fuel through opening 92 as there is a specific fuel fill cup on the back of the vehicle 6 to receive a filling station nozzle.

As best seen in FIGS. 2 and 3, the understructure 5 also has several circular openings 98 which receive tie-down rings or anchors (not shown). The anchors are used to secure cargo in the bed 10. The anchor ring openings 98 are approximately three inches in diameter and able to receive a plug or bracket to which an anchor ring can be secured. For heavy duty applications, an anchor ring could be attached directly to the vehicle frame 56 and extend through openings 98 rather than attaching to the understructure. In this embodiment, the understructure 5 has four anchor ring openings 98; however, it is foreseen that an understructure may have any number of openings 98.

Figure 7:
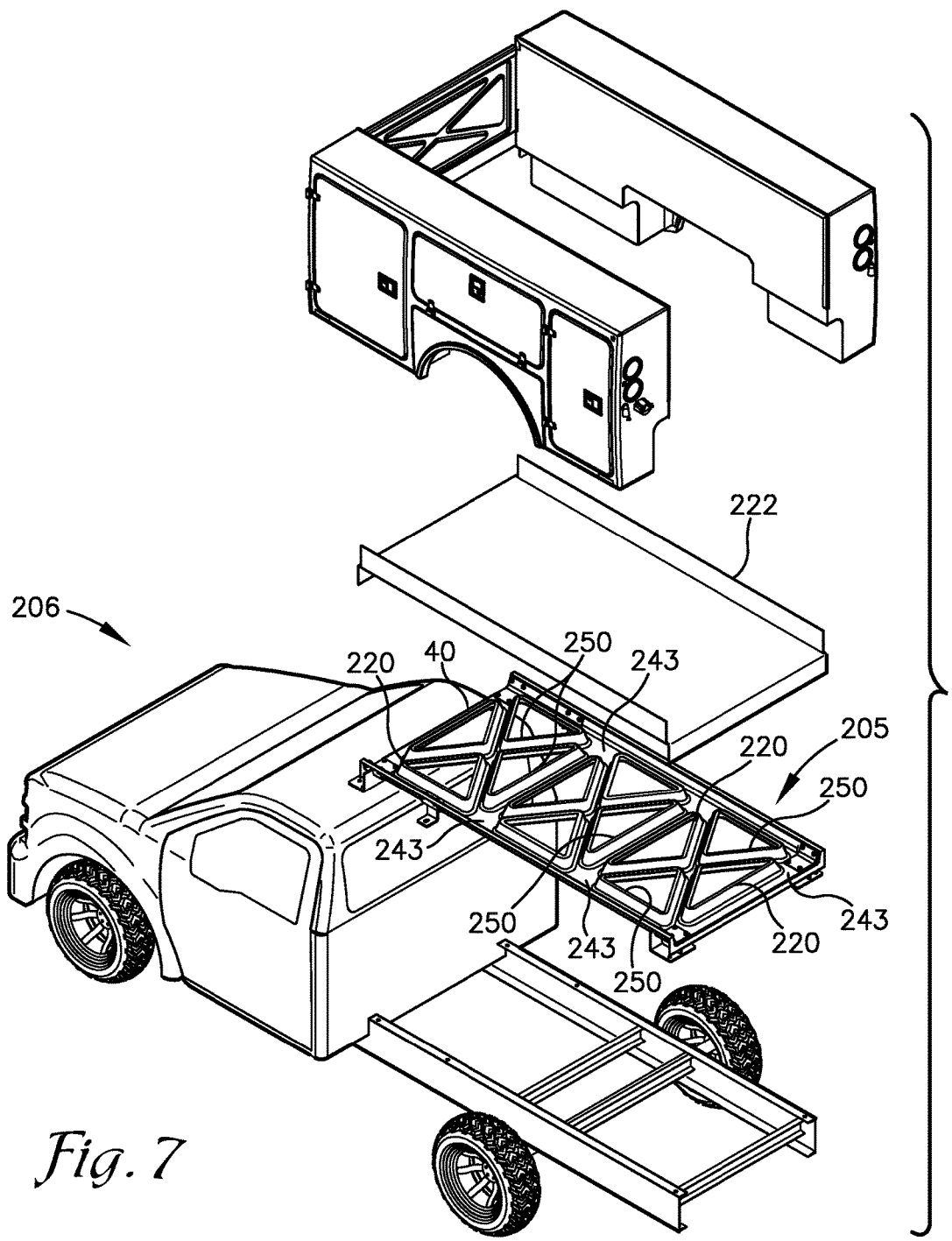
FIG. 7 is an exploded perspective view of the rear cargo area of the utility vehicle of FIG. 6, showing a second embodiment of the understructure in accordance with the present invention.

The floor plate 22 is secured over the top surface of the understructure 5. Floor plate 22 serves as the loading surface of the bed. As best seen in FIGS. 2 and 7, the floor plate 22 is substantially rectangular with two upwardly turned side flanges 107 along its longitudinal perimeter. The side flanges 107 extend along the length of the plate 22 and extend upwardly therefrom from approximately and preferably three inches. The upwardly turned side flanges 107 are attached to the bed side walls 31. The floor plate 22 also has two end flanges 108 which extend along the plate's front and back edges. The end flanges 108 extend downwardly approximately six inches from the front and back edges of the plate 22.

Floor plate 22 has openings that correspond to the size, shape and location of certain openings the in understructure 5. For example, floor plate 22 has an opening 106 which corresponds to aerial tower opening 83, an opening 110 which corresponds to fuel tank access opening 92, and openings 112 which correspond to anchor ring openings 98. The floor plate 22 openings align with the understructure 5 openings when the floor plate and understructure are adhered together. A removable access door 109 covers the fuel tank opening 110 in floor plate 22. Access door 109 may be hinged or completely removable and has a mechanism for locking the door when closed. Also, the anchor ring openings 112 in floor plate 22 may have a plug or bracket to which an anchor ring can be secured. It is foreseen that floor plate 22 could use sizes and shapes for its openings that are different than the sizes and shapes of the openings in understructure 5. Floor plate 22 would typically not have openings corresponding to openings 101 of understructure 100 which are primarily for reducing the weight of an understructure.

The floor plate 22 attaches over the top of the understructure 5 to form the bed support assembly 24. Floor plate 22 is attached to the understructure using a high strength adhesive 111 designed for bonding composite materials. One example of a manufacturer that makes such adhesives is ITW Plexus®. To attach floor plate 22 to understructure 5, the high strength adhesive 111 is applied to the surface of the raised areas 20 on understructure 5 and then floor plate 22 is placed over the adhesive coated ridges 20. Accordingly, the bottom surface of the floor plate 22 bonds to the top surface of the raised areas 20. The adhesive is allowed to cure which fixedly bonds the floor plate 22 to understructure 5.

The components forming the bed, including the understructure 5, floor plate 22, side walls 31, front wall 33 and utility compartments 34 are preferably formed from a fiber reinforced resin composite material such as fiberglass and can be formed using a process called resin transfer molding (RTM). The RTM process involves placing mats or sheets of woven fibers in a mold, closing the mold, injecting resin into the mold until substantially all of the air in the mold has been displaced by resin and then allowing the resin to cure or polymerize (heat may be added if necessary to facilitate curing). After the resin has cured, understructure 5 is removed from the mold and trimmed, sanded, or polished as necessary to create the final product. Commonly used fibers are glass or carbon, and a resin that may be used is vinyl ester. It is foreseen that other materials or processes for forming a fiber reinforced composite material can also be used to create understructure 5.

Figure 8:
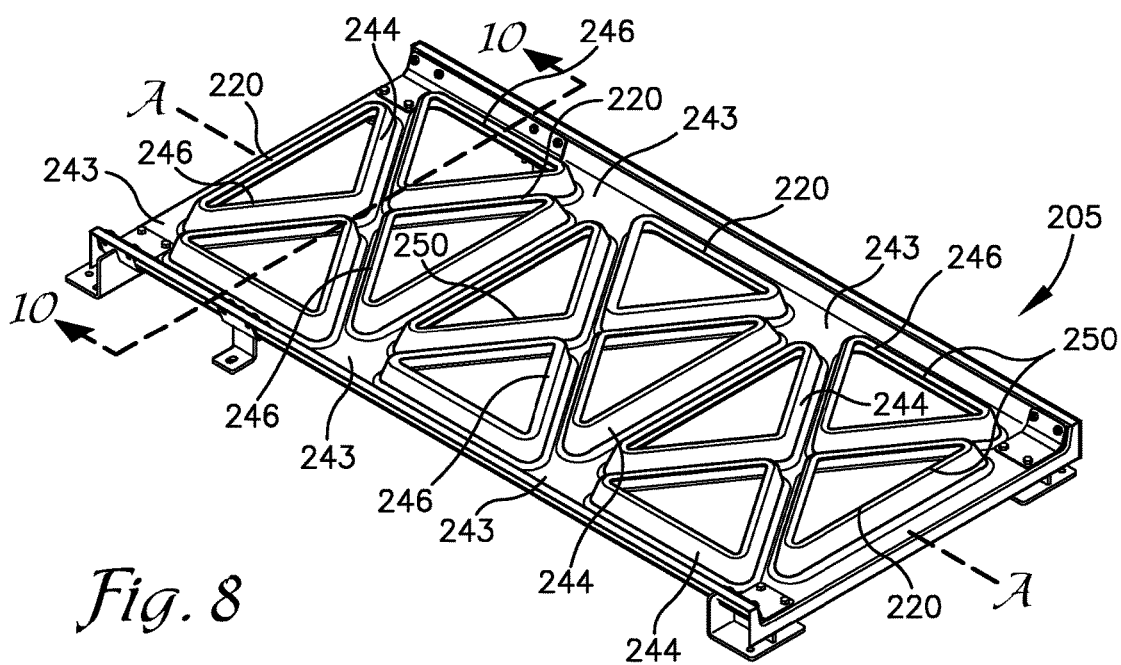
FIG. 8 is a perspective view of the composite understructure of FIG. 7.
Figure 9:
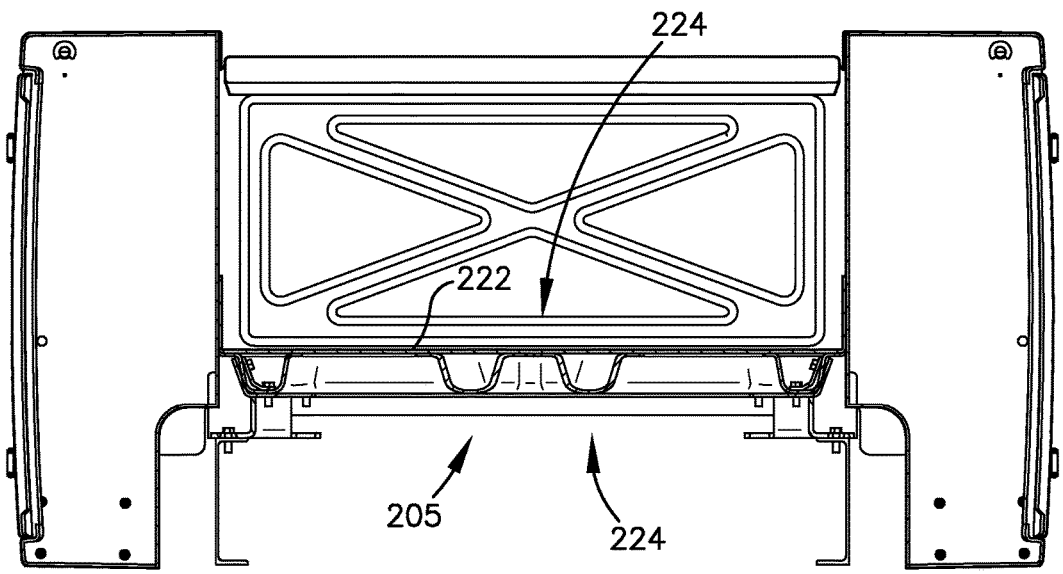
FIG. 9 is a cross-sectional view of the bed of the utility vehicle taken along line 9-9 of FIG. 6.
Figure 10:
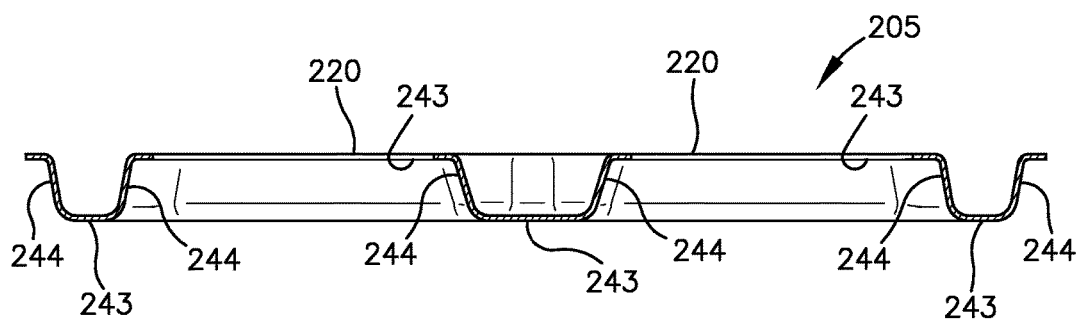
FIG. 10 is a cross-sectional view of the composite understructure taken along line 10-10 of FIG. 8.

Now, with regard to the second embodiment shown in FIGS. 6-10, only the differences between and distinctions from the first embodiment will be discussed in detail. The understructure 205 of the second embodiment, as best seen in FIGS. 7 and 8, does not have an aerial tower opening and may or may not have fuel tank access openings or anchor ring openings. The understructure 205 includes cut-outs 250 in many of the ridges 220 framed by walls 244 which extend upwardly from the understructure's surface 243. The openings 250 are formed in the planar or plateaued flat portion of the raised areas 220. A rim 246 forms the periphery of each cut-out 250 and extends inwardly from the corresponding wall 244. Cut-out openings 250 are beneficial because they reduce the weight of the understructure 205 as well as allow access to items installed below the understructure 205. While cut-outs 205 are shown and described in connection with this embodiment, it is foreseen that such cut-outs could also be used in connection with the first embodiment.

It is to be understood that while certain forms of the present invention have been illustrated and described herein, it is not to be limited to the specific forms or arrangement of parts described and shown.

Having thus described the invention, what is claimed as new and desired to be secured by this patent is as follows:

1. A bed assembly securable to the frame of a truck comprising:
   a support formed from a composite material, said support having a first surface and a second vertically offset surface;
   at least one connecting member extending from said first surface to said second vertically offset surface, said members providing strength to said support;
   a floor plate fabricated from a composite material, said floor plate secured to said second vertically offset surface, said floor plate adapted to serve as a loading surface for the bed assembly;
   a bracket secured to said support for mounting said support to the frame of the truck; and
   a backing plate secured to said support, wherein said backing plate and said bracket sandwich said support to secure it to the frame of the truck.

2. The bed assembly as in claim 1 wherein said second vertically offset surface is planar.

3. The bed assembly as in claim 2 wherein said first surface is planar.

4. The bed assembly as in claim 1 wherein said support includes a cut-out portion.

5. The bed assembly as in claim 1 wherein said bracket is adapted to be spring-bolted to the frame of the truck.

6. The bed assembly as in claim 1 further comprising first and second utility compartments secured on opposite sides of said floor plate.

7. The bed assembly as in claim 1 wherein said floor plate includes first and second upwardly projecting side flanges extending along first and second longitudinal sides of said floor plate respectively.

8. The bed assembly as in claim 7 further comprising first and second utility compartments secured adjacent the first and second longitudinal sides of said floor plate respectively with the first and second upwardly projecting side flanges attached to the first and second utility compartments respectively.

9. The bed assembly as in claim 7 and further comprising first and second downwardly projecting side flanges extending along front and rear edges of said floor plate respectively.

10. The bed assembly as in claim 1 wherein said at least one connecting member of said understructure comprises a plurality of connecting members and said understructure includes first and second side edges extending generally in parallel alignment and wherein at least portions of at least two of the connecting members extend diagonally relative to said first and second side edges and form an X-shape.

11. The bed assembly as in claim 1 wherein said floor plate is secured to said second vertically offset surface using an adhesive.

12. A bed assembly securable to the frame of a truck comprising:
   a support formed from a fiber reinforced composite material, said support having a first surface and a second vertically offset surface;

at least one connecting member extending from said first surface to said second vertically offset surface, said members providing strength to said support;

a floor plate secured to said second vertically offset surface, said floor plate fabricated from a fiber reinforced composite material and having first and second upwardly projecting side flanges extending along first and second longitudinal sides of said floor plate respectively; and first and second utility compartments secured adjacent the first and second longitudinal sides of said floor plate respectively with the first and second upwardly projecting side flanges attached to the first and second utility compartments respectively.

13. The bed assembly as in claim 12 wherein said second vertically offset surface is planar.

14. The bed assembly as in claim 12 further comprising first and second downwardly projecting side flanges extending along front and rear edges of said floor plate respectively.

15. The bed assembly as in claim 12 wherein said at least one connecting member of said understructure comprises a plurality of connecting members and wherein at least portions of at least two of the connecting members extend diagonally relative to said first and second longitudinal sides and form an X-shape.

16. The bed assembly as in claim 12 wherein said floor plate is secured to said second vertically offset surface using an adhesive.

* * * * *